(12) United States Patent
Barriau et al.

(10) Patent No.: US 9,790,341 B2
(45) Date of Patent: Oct. 17, 2017

(54) THERMALLY EXPANDABLE PREPARATIONS

(71) Applicant: HENKEL AG & CO. KGaA, Duesseldorf (DE)

(72) Inventors: Emilie Barriau, Niguel Laguna, CA (US); Martin Renkel, Duesseldorf (DE); Rainer Schoenfeld, Duesseldorf (DE); Sven Wucherpfennig, Dormagen (DE); Tim Welters, Hilden (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 544 days.

(21) Appl. No.: 14/491,034

(22) Filed: Sep. 19, 2014

(65) Prior Publication Data

US 2015/0064380 A1    Mar. 5, 2015

Related U.S. Application Data

(63) Continuation of application No. PCT/EP2013/056087, filed on Mar. 22, 2013.

(30) Foreign Application Priority Data

Mar. 29, 2012    (DE) .................. 10 2012 205 057

(51) Int. Cl.
| | |
|---|---|
| B29D 22/00 | (2006.01) |
| B05D 7/22 | (2006.01) |
| C08G 18/08 | (2006.01) |
| C08G 59/00 | (2006.01) |
| C08J 9/00 | (2006.01) |
| C08G 59/22 | (2006.01) |
| C08G 59/38 | (2006.01) |
| C08K 7/02 | (2006.01) |
| C08G 59/36 | (2006.01) |
| C08L 63/00 | (2006.01) |
| C08K 3/00 | (2006.01) |

(52) U.S. Cl.
CPC .......... *C08J 9/0085* (2013.01); *C08G 59/226* (2013.01); *C08G 59/36* (2013.01); *C08G 59/38* (2013.01); *C08J 9/0066* (2013.01); *C08K 7/02* (2013.01); *C08L 63/00* (2013.01); *C08J 2363/00* (2013.01); *C08K 3/0033* (2013.01); *C08L 2205/02* (2013.01); *Y10T 428/1376* (2015.01)

(58) Field of Classification Search
CPC ...... C08G 59/226; C08G 59/38; C08G 59/36; C08K 7/02; C08K 3/0033; C08L 63/00; C08L 2205/02; C08J 9/0066; C08J 9/0085; C08J 2363/00; Y10T 428/1376
USPC ......... 428/36.5; 427/230; 521/122, 123, 178
See application file for complete search history.

(56) References Cited

U.S. PATENT DOCUMENTS

2004/0266899 A1* 12/2004 Muenz .................. C08G 59/40
                                                                521/135

FOREIGN PATENT DOCUMENTS

| | | |
|---|---|---|
| DE | 10163253 A1 | 7/2003 |
| DE | 102007025870 A1 | 4/2008 |
| DE | 102008053520 A1 | 5/2010 |
| DE | 102009028100 A1 | 2/2011 |
| DE | 102009029030 A1 | 3/2011 |
| DE | 102010028586 A1 | 11/2011 |
| EP | 337144 A1 | 10/1989 |
| EP | 1469020 A1 | 10/2004 |
| WO | 9916840 A1 | 4/1999 |
| WO | 0231077 A2 | 4/2002 |
| WO | 2004065485 A1 | 8/2004 |
| WO | 2004111136 A1 | 12/2004 |
| WO | 2006053640 A1 | 5/2006 |
| WO | 2007025007 A1 | 3/2007 |

OTHER PUBLICATIONS

International Search Report for PCT/EP2013/056087, 2 pages.

* cited by examiner

*Primary Examiner* — William Cheung
(74) *Attorney, Agent, or Firm* — Steven C. Bauman

(57) ABSTRACT

The subject matter of the present application is a thermally expandable preparation that can be pumped at application temperatures below 70° C., containing (a) at least one first epoxy resin E1 that has an epoxy equivalent weight of at most 280 g/eq and a viscosity of at most 1250 Pa*s at 25° C., (b) at least one second epoxy resin E2 that has an epoxy equivalent weight of at least 300 g/eq and a viscosity of at most 250 Pa*s at 25° C., (c) at least one hardener that can be thermally activated, (d) at least one propellant that can be thermally activated, and (e) at least 1 wt. % of organic fibres having a fibre length of 0.2 mm to 10 mm.

13 Claims, No Drawings

THERMALLY EXPANDABLE PREPARATIONS

CROSS-REFERENCE TO RELATED APPLICATIONS

This U.S. National Stage Application is a continuation application, under 35 U.S.C. §365, of PCT/EP 2013/056087, which was filed in Europe Mar. 22, 2013, which claims foreign priority benefits based on DE 102012205057.4, filed in Mar. 29, 2012, filed in Germany.

The present application relates to a thermally expandable preparation pumpable at application temperatures below 70° C., containing a combination of specific epoxy resins, a thermally activatable hardener, a thermally activatable blowing agent and specifically selected organic fibers, to a method for stiffening components having thin-walled structures using such preparations and to the use of these preparations for stiffening structures of this type.

Lightweight components for consistently dimensionally stable mass production, having high rigidity and structural strength, are needed for many fields of application. In automotive construction in particular, because of the desired weight savings in that sector, there is a high demand for lightweight components made from thin-walled structures that nevertheless have adequate rigidity and structural strength. One way of achieving high rigidity and structural strength combined with the lowest possible component weight uses hollow components manufactured from relatively thin sheet metal or plastics sheets. Thin-walled sheet metal is very prone to deformation, however. In the case of hollow structures, it has thus been known for some time to pack this cavity with a structural foam, completely or only partially, e.g. in areas subject to particular mechanical stress. On the one hand, this can minimize or even totally prevent deformation or distortion and on the other hand it can increase the strength and rigidity of these hollow structures.

Such expanded reinforcing and stiffening agents are conventionally either metal foams or are made from thermally curable and expandable preparations, e.g. based on epoxy resins. In the latter case, the preparations are generally prepared in the form of thermally curable and expandable molded articles based on reactive epoxy resins, which are made by conventional injection molding techniques. These molded articles are each precisely adapted to the desired end use in their spatial configuration. Within the framework of the manufacturing of lightweight components, the curable and expandable molded articles are then introduced into the components to be reinforced in situ and are cured and expanded in a separate processing step by heating (e.g. within the framework of the coating process). These molded articles and the use thereof are described e.g. within the framework of WO-A1-2004/065485. For this procedure, however, it is necessary to develop an appropriately designed molding and the injection molds needed to produce it for each component to be reinforced, which is costly and makes the flexible use of these reinforcing agents virtually impossible.

This method also has the disadvantage that the preparation, which is solid at ambient temperature, has to be heated in order to produce the molded articles, which may under certain conditions lead to the early initiation of the irreversible, strongly exothermic curing process. In some cases, slight curing of the systems is even knowingly accepted in order to optimize the dimensional stability and surface finish of the molded articles.

As an alternative, e.g. in WO-A2-2002/31077, two-component systems for the stiffening of components were proposed, which cure at temperatures as low as ambient temperature. However, such systems involve increased risks in terms of metering accuracy, which has a negative effect on both the rate of expansion and the resulting mechanical properties. In addition, these systems that cure at ambient temperature lead to structural foams that are inferior to hot-cured systems in terms of their thermomechanical properties.

As a third alternative, paste-like structural adhesives can be employed. However, these have the disadvantage of inadequate non-sag properties, particularly if they are applied in relatively large film thicknesses. In addition, these paste-like structural adhesives tend to flow out of the target area of application during the heating process and therefore do not develop their full efficacy at the desired site.

Accordingly, the object of the present invention was to provide preparations for producing structural foams for the local reinforcing of components, which display a liquid to paste-like consistency in the uncured state and yet exhibit a sufficiently high level of non-sag properties even before curing, so that they remain at the application site and do not slump, even during the heating process.

Surprisingly, it has now been found that thermally expandable preparations containing a combination of at least two specifically selected epoxy resins and specific organic fibers display behavior such that, on the one hand, good application by means of conventional pumps is guaranteed and, on the other hand, the applied preparation exhibits adequate non-sag properties even before curing, so that the preparation is prevented from slipping away from the area of application before curing or during the heating process. In addition, the cured preparations are distinguished by mechanical properties that correspond to those of conventional stiffening foams based on solid molded articles.

The present invention therefore firstly provides thermally expandable preparations pumpable at application temperatures below 70° C., containing (a) at least one first epoxy resin E1 that has an epoxy equivalent weight of at most 280 g/eq and a viscosity at 25° C. of at most 1250 Pa*s,
(b) at least one second epoxy resin E2 that has an epoxy equivalent weight of at least 300 g/eq and a viscosity at 25° C. of at most 250 Pa*s,
(c) at least one thermally activatable hardener,
(d) at least one thermally activatable blowing agent, and
(e) at least 1 wt. % organic fibers having a fiber length from 0.2 mm to 10 mm.

The preparations according to the invention are distinguished in particular by the fact that they can be heated reversibly (without any significant change in the temperature-dependent viscosity behavior) to temperatures up to 70° C. and can therefore be transported and/or shaped multiple times within this temperature range using heated pumps.

Unless otherwise stated, the viscosities are determined within the framework of the present application under the following test conditions: rotational rheometer with plate-plate geometry (PP20), measured in oscillation at 10% deformation and a frequency of 100 rad/s, film thickness of the material 0.2 mm.

"Preparations pumpable at application temperatures below 70° C." are understood according to the invention to be preparations that can be applied at temperatures below 70° C. using conventional pumps with a pressure of less than 250 bar, in particular less than 200 bar, most particularly from 6 to 180 bar, from a storage vessel to the application site. Preparations that can be applied at application temperatures in the range from 50 to 60° C. using conventional pumps with a pressure of less than 250 bar, in particular less than 200 bar, most particularly from 6 to 180 bar, from a storage vessel to the application site are particularly preferred.

Most particularly preferred according to the invention are preparations that are "pumpable at application temperatures below 70° C." in the sense that, at 60° C. and with a pump pressure of 6 bar, they exhibit a flow rate of at least 100 g/min, preferably from 150 g/min to 4500 g/min, most preferably from 250 g/min to 3000 g/min if they are discharged from a completely filled, commercial aluminum nozzle cartridge with a capacity of 310 ml and an internal diameter of 46 mm, the discharge outlet of which has been opened with the aid of a cartridge-piercing tool having an external diameter of 9 mm, without attaching a nozzle, at a temperature of 60° C. (after pre-heating for 45 minutes) and a pressure of 6 bar. The flow rate expresses the mass of preparation that can be discharged within 1 minute and is accordingly expressed in g/min.

A first component that is essential to the invention is a first epoxy resin E1 that has an epoxy equivalent weight of at most 280 g/eq and a viscosity at 25° C. of at most 1250 Pa*s.

In one embodiment, it has proved particularly advantageous if the epoxy resin E1
  has an epoxy equivalent weight of at most 220 g/eq, in particular of at most 200 g/eq, and/or
  has a viscosity at 25° C. of at most 20 Pa*s, in particular of at most 15 Pats and/or
  is contained in the preparation in a quantity from 10 to 55 wt. %, in particular from 20 to 40 wt. %, based on the total ready-to-use preparation.

In one embodiment of the present invention, it has proved to be particularly preferred if the epoxy resin E1 has a viscosity at 25° C. of at least 5 Pa*s, in particular of at least 10 Pa*s.

Particularly preferred epoxy resins E1 are bisphenol A- and bisphenol F-based epoxy resins which exhibit the properties that are essential to the invention.

Although in principle, epoxy resins with any functionalities can be employed, it has proved advantageous within the framework of the present invention if the epoxy resins have an epoxy functionality of 2 or less. Epoxy resins with an epoxy functionality of 2 can be most particularly preferred.

One group of the preferred epoxy resins E1 according to the invention is the group of the reactive diluents. Reactive diluents within the meaning of this invention are epoxy group-containing, low-viscosity substances (glycidyl ethers or glycidyl esters) with an aliphatic or aromatic structure. Typical examples of reactive diluents are mono-, di- or triglycidyl ethers of $C_6$ to $C_{14}$ monoalcohols or alkylphenols and the monoglycidyl ethers of cashew nut shell oil, diglycidyl ethers of ethylene glycol, diethylene glycol, triethylene glycol, tetraethylene glycol, propylene glycol, dipropylene glycol, tripropylene glycol, tetrapropylene glycol, 1,4-butylene glycol, 1,5-pentanediol, 1,6-hexanediol, cyclohexanedimethanol, triglycidyl ethers of trimethylolpropane and the glycidyl esters of $C_6$ to $C_{24}$ carboxylic acids or mixtures thereof.

Furthermore, the following commercial products are preferred epoxy resins E1 according to the invention:

DER 331 ® (EEW 182-192 g/eq; Dow)
Epikote ® 834 (EEW 230-270 g/eq; Momentive)

-continued

EPON ® 828 (EEW 184-190 g/eq; Momentive)
DER ® 354 (EEW 167-174 g/eq; Dow)
DER ® 736 (EEW 175-205 g/eq; Dow)
DER ® 351 (EEW 169-181 g/eq; Dow)
DER ® 332 (EEW 171-175 g/eq; Dow)
Epon ® 862 (EEW 166-177 g/eq; Momentive)
Erisys ® GE-30 (EEW 135-150 g/eq; CVC Thermoset Specialities)
Erisys ® GE-20 (EEW 125-137 g/eq; CVC Thermoset Specialities)
Araldite ® GY282 (EEW 166-177 g/eq; Huntsman)
Araldite ® GY260 (EEW 185-196 g/eq; Huntsman)
Dehysol ® D81 (EEW 240 g/eq; BASF)
hydrogenated epoxy resins based on bisphenol A and/or bisphenol F
Araldite ® MY0500 (EEW 105-115 g/eq; Huntsman)

As a second component that is essential to the invention, the thermally expandable preparations contain at least one second epoxy resin E2 that has an epoxy equivalent weight of at least 300 g/eq and a viscosity at 25° C. of at most 250 Pa*s.

It has proved particularly preferable here if the second epoxy resin E2
  has an epoxy equivalent weight of at least 400 g/eq, in particular of at least 440 g/eq, and/or
  has a viscosity at 25° C. of at most 200 Pa*s, in particular of at most 170 Pa*s, and/or
  is contained in the preparation in a quantity from 5 to 35 wt. %, in particular from 8 to 25 wt. %, based on the total ready-to-use preparation.

In one embodiment of the present invention it has proved to be particularly preferred if the epoxy resin E2 has a viscosity at 25° C. of at least 1 Pa*s and in particular of at least 2.5 Pa*s.

A group of preferred epoxy resins E2 according to the invention is represented by the group of the flexibilizing resins, such as e.g. epoxidized polyether structures.

Particularly preferred epoxy resins E2 according to the invention are e.g. the commercial products DER 732 (EEW 310-330 g/eq, Dow),
Thioplast EPS-25 (EEW 500-600 g/eq; Akzo Nobel)
Struktol Polydis ® 3604 (EEW 330 g/eq; Schill & Seilacher)
Struktol Polydis ® 3605 (EEW 300 g/eq; Schill & Seilacher)
Fortegra ® 102 (EEW 345-374 g/eq; Dow)
Adeka ® EP-4005 (EEW 310-340 g/eq; Adeka)

It has proved to be preferred according to the invention if the application preparations according to the invention contain a total quantity of epoxy resins in the range from 20 to 80 wt. %, in particular from 30 to 70 wt. %, most particularly from 40 to 60 wt. %, based on the total application preparation. According to the invention, the total quantity of epoxy resins here comprises both the quantities of resins E1 and E2 that are essential to the invention and any other epoxy resins that may be present in the preparation.

As a third component that is essential to the invention, the thermally expandable preparations according to the invention contain at least one thermally activatable hardener.

A thermally activatable hardener is understood according to the invention to mean compounds that can be stored together with the epoxy resins for at least one month at 22° C. without the curing reaction starting to any significant extent. The molecular structure of the thermally activatable hardener preferably changes only above 80° C., in particular only above 100° C., so that these compounds act as a hardener above this temperature and initiate and/or accelerate the polymerization reaction of the epoxy resins.

The thermally activatable hardeners can be selected from e.g. the following compounds: guanidines, substituted guanidines, substituted ureas, melamine resins, guanamine derivatives, cyclic tertiary amines, aromatic amines and/or mixtures thereof. The hardeners can be incorporated into the curing reaction stoichiometrically, but they can also be catalytically active. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and most particularly cyanoguanidine (dicyandiamide). Alkylated benzoguanamine resins, benzoguanamine resins or methoxymethylethoxymethylbenzoguanamine may be mentioned as representatives of suitable guanamine derivatives. Furthermore, 3,3-diaminodiphenylsulfone and 4,4-diaminodiphenylsulfone and derivatives thereof as well as ionic liquids (imidazolium salts), such as for instance Baxxodur® ECX-2450, can be used as latent hardeners. Furthermore, the thermally activatable hardeners marketed with the trade names Ancamine® 2014, Ancamine® 2337, Adeka® EH-4357 and Adeka® EH-4360 are preferred according to the invention. Likewise preferred are the products marketed by Ajinomoto with the trade name Ajicure®, in particular the products Ajicure® AH-300, Ajicure® PN23, Ajicure® PN50, Ajicure® MY24 and Ajicure® MY25. Microencapsulated systems, as marketed by Asahi Denka with the trade name Novacure®, are also preferred according to the invention. Dicyandiamide is most particularly preferably suitable as a thermally activatable hardener.

The thermally activatable hardeners, in particular dicyandiamide, are contained according to the invention preferably in a quantity from 1 to 15 wt. %, in particular from 2 to 10 wt. %, based in each case on the total application preparation.

In addition to the aforesaid hardeners, catalytically active substituted ureas can be employed according to the invention as curing accelerators. These are, in particular, p-chlorophenyl-N,N-dimethyl urea (monuron), 3-phenyl-1,1-dimethylurea (fenuron) or 3,4-dichlorophenyl-N,N-dimethyl urea (diuron). In principle, it is also possible to employ catalytically active tertiary acrylic amines or alkylamines, such as e.g. benzyldimethylamine, tris(dimethylamino)phenol, piperidine or piperidine derivatives. Furthermore, various, preferably solid imidazole derivatives can be employed as catalytically active curing accelerators. The following may be mentioned as representatives: 2-ethyl-2-methylimidazole, N-butylimidazole, benzimidazole and N—$C_1$ to $C_{12}$ alkylimidazoles or N-arylimidazoles. Furthermore, adducts of amino compounds to epoxy resins are suitable as cure-accelerating additions to the aforesaid hardeners. Suitable amino compounds are tertiary aliphatic, aromatic or cyclic amines. Suitable epoxy compounds are e.g. polyepoxides based on glycidyl ethers of bisphenol A or F or of resorcinol. Specific examples of these adducts are adducts of tertiary amines, such as 2-dimethylaminoethanol, N-substituted piperazines, N-substituted homopiperazines, N-substituted aminophenols, on di- or polyglycidyl ethers of bisphenol A or F or of resorcinol.

The curing accelerators for epoxy resins are contained according to the invention preferably in a quantity from 0 to 3 wt. %, in particular from 0.1 to 1.5 wt. %, based in each case on the total application preparation.

As a fourth component that is essential to the invention, the thermally expandable preparations according to the invention contain a thermally activatable blowing agent. In principle, all known blowing agents are suitable as the thermally activatable blowing agent, such as e.g. "chemical blowing agents", which release gases by decomposition during heat treatment, or "physical blowing agents", i.e. in particular thermally expandable hollow spheres.

A chemical blowing agent is understood according to the invention to mean compounds that decompose under the action of heat, releasing gases.

Examples of suitable chemical blowing agents are azo compounds, hydrazide compounds, nitroso compounds and carbazide compounds, such as e.g. azobisisobutyronitrile, azodicarbonamide (ADCA), dinitrosopentamethylenetetramine, 4,4'-oxybis(benzenesulfonic acid hydrazide) (OBSH), 4-methylbenzenesulfonic acid hydrazide, azocyclohexyl nitrile, azodiaminobenzene, benzene-1,3-sulfonyl hydrazide, calcium azide, 4,4'-diphenyl disulfonyl azide, diphenylsulfone-3,3'-disulfohydrazide, benzene-1,3-disulfohydrazide, trihydrazinotriazine, p-toluenesulfonyl hydrazide and p-toluenesulfonyl semicarbazide.

Another class of suitable blowing agents are the H-silanes (poly(methylhydrosiloxanes)), which are marketed e.g. by Huntsman with the trade name Foaming Agent DY-5054.

Furthermore, the carbamates described in DE-A1-102009029030 are particularly suitable as chemical, thermally activatable blowing agents within the meaning of the present invention.

The chemical, thermally activatable blowing agents are contained according to the invention preferably in a quantity from 0.5 to 6 wt. %, in particular from 0.7 to 3 wt. %, based in each case on the total application preparation.

The "chemical blowing agents" according to the invention can advantageously be employed in combination with activators and/or accelerators, such as e.g. zinc compounds (e.g. zinc oxide, zinc stearate, zinc ditoluenesulfinate, zinc dibenzenesulfinate), magnesium oxide and/or (modified) ureas. The zinc compounds, in particular zinc ditoluenesulfinate, are particularly preferred according to the invention.

According to the invention, it is substantially unimportant whether the blowing agents are already employed in activated form or whether the thermally expandable preparations contain an appropriate activator and/or accelerator, such as e.g. zinc ditoluenesulfonate, in addition to the blowing agents.

It has proved particularly advantageous if the thermally expandable preparations according to the invention contain the activators and/or accelerators, in particular the zinc compounds, most particularly the zinc ditoluenesulfinate, in a quantity from 0.2 to 1.4 wt. %, in particular from 0.5 to 1.2 wt. %, most particularly from 0.5 to 0.85 wt. %, based on the total mass of the thermally expandable preparation.

As physical blowing agents, expandable hollow plastic microspheres based on polyvinylidene chloride copolymers or acrylonitrile/(meth)acrylate copolymers are preferably employed. These are commercially available e.g. with the names "Dualite®" and "Expancel®" from Pierce & Stevens and Akzo Nobel respectively.

It can be preferred according to the invention to employ a combination of at least one chemical, thermally activatable blowing agent and at least one physical, thermally activatable blowing agent in the thermally expandable preparations.

The quantity of blowing agent is preferably selected such that the volume of the thermally expandable material increases irreversibly upon heating to activation temperature (or expansion temperature) by at least 5%, preferably at least 10% and in particular at least 20%. This is to be understood as meaning that, in addition to the normal and reversible thermal expansion according to its coefficient of thermal expansion, the material increases its volume irreversibly compared with its initial volume at ambient temperature (22° C.) upon heating to the activation temperature such that, after cooling back to ambient temperature, it is at least 5%, preferably at least 10% and in particular at least 20% greater than before being heated. The degree of expansion stated thus refers to the volume of the material at ambient temperature before and after the temporary heating to the activation temperature. The upper limit of the degree of expansion, i.e. the irreversible increase in volume, can be adjusted by selecting the quantity of the blowing agent so that it is below 300%, in particular below 200%.

The activation temperature is preferably in the range from 120 to 220° C. This temperature should preferably be maintained for a period in the range from 10 to 150 minutes.

As a fifth essential component, the thermally expandable preparations pumpable at application temperatures below 70° C. according to the invention contain at least 1 wt. % organic fibers having a fiber length from 0.2 to 10 mm.

"Organic fibers" here are understood according to the invention to mean all fibers that consist predominantly, i.e. preferably to a level of at least 85 wt. %, in particular at least 95 wt. %, of molecules that are classed as belonging to organic chemistry. Carbon fibers are explicitly excluded from the organic fibers according to the invention.

Surprisingly, it was found within the framework of the work on which this application is based that conventionally used fibers, such as e.g. glass fibers, do not lead to pumpable, thermally expandable preparations with the desired thixotropic properties and exhibit significantly poorer non-sag properties compared with the preparations according to the invention based on organic fibers, in particular polyaramid fibers.

Preferred organic fibers according to the invention are e.g. polyamide fibers or polyester fibers; however, natural fibers, such as e.g. cellulose fibers, jute fibers or hemp fibers, are also preferred according to the invention.

It has proved to be preferred according to the invention if organic fibers that have a melting point of at least 130° C. are employed. Organic fibers having a melting point above the curing temperature of the preparations according to the invention, in particular above 150° C., most particularly above 180° C., can be particularly preferred according to the invention.

Particularly advantageous properties according to the invention are exhibited by thermally expandable preparations containing polyamide fibers.

Polyamide fibers that are derived from a primary amine, in particular an aromatic primary amine, are preferred according to the invention. Polyamide fibers of which the amine-based repeating units are derived from p-phenylenediamine and/or m-phenylenediamine are particularly preferred, and p-phenylenediamine is most particularly preferred.

Polyamide fibers that are derived from aromatic carboxylic acids are likewise preferred according to the invention. These preferred aromatic carboxylic acids according to the invention are e.g. phthalic acid, isophthalic acid and terephthalic acid. Terephthalic acid is most particularly preferred according to the invention.

Polyamide fibers in which at least 80% of the amide groups are bound directly to two aromatic rings, the so-called polyaramid fibers, are most particularly preferred according to the invention. Extremely advantageous organic fibers according to the invention are marketed e.g. by Dupont with the trade names Kevlar® 1F561, Kevlar® 1F1464 and Kevlar® 1F107.

The thermally expandable preparations contain the organic fibers, in particular the polyaramid fibers, preferably in a quantity from 1 to 10 wt. %, in particular 1.5 to 5.5 wt. %, based on the total preparation.

In a particular embodiment of the present invention, it has proved particularly advantageous according to the invention if the thermally expandable preparation contains less than 1.5 wt. %, preferably less than 0.5 wt. %, based on the total application preparation, of an epoxy resin that is solid at 25° C. This measure enables the flow behavior of the thermally expandable preparation to be optimized particularly well before the start of curing.

An epoxy resin is described as "solid" according to the invention if the geometry of the uncured raw material does not distort under the influence of gravity at the stated temperature within 1 hour, in particular within 24 hours.

Furthermore, it has proved advantageous if the thermally expandable preparations according to the invention contain at least 20 wt. %, in particular at least 30 wt. %, of fillers, based in each case on the total application preparation.

It has proved to be preferred according to the invention in this case if two or more different fillers are contained.

In a first preferred embodiment, the thermally expandable preparations contain at least one lightweight filler as a filler. Lightweight fillers are distinguished according to the invention by the fact that they have a lower density than the ready-to-use preparation that surrounds them; thus, the use of lightweight fillers reduces the density of the overall preparation.

These lightweight fillers can be selected from the group of the hollow metal spheres, such as e.g. hollow steel spheres, hollow glass spheres, pulverized fuel ash (Finite), hollow plastic spheres based on phenolic resins, epoxy resins or polyesters, expanded hollow microspheres with a wall material made of (meth)acrylic acid ester copolymers, polystyrenes, styrene (meth)acrylate copolymers and in particular of polyvinylidene chloride and copolymers of vinylidene chloride with acrylonitrile and/or (meth)acrylic acid esters, ceramic hollow spheres or organic lightweight fillers of natural origin, such as ground nutshells, e.g. the shells of cashew nuts, coconuts or peanut shells as well as ground cork or coke powder. Those lightweight fillers based on hollow microspheres that provide the cured preparation with high pressure resistance are particularly preferably selected. Hollow glass spheres are particularly preferred according to the invention, since apart from the weight reduction of the preparations, these make it possible to achieve a high pressure resistance of the cured systems and additionally counteract overheating of the systems during the curing process resulting from the exothermic reaction that takes place.

Lightweight fillers are contained in the thermally expandable preparations preferably in a quantity from 2 to 20 wt. %, in particular from 5 to 16 wt %, based on the total thermally expandable preparation.

Furthermore, it has proved advantageous if the thermally expandable preparation contains at least one inorganic filler as an additional filler.

Suitable inorganic fillers are e.g. the various ground or precipitated chalks, carbon black, calcium-magnesium carbonates, talcum, graphite, barytes, silicon dioxide and in particular silicate fillers of the aluminum-magnesium-calcium silicate type, e.g. wollastonite or chlorite. Chalks are preferred according to the invention; most particularly preferred are ground mineral chalks.

The inorganic fillers, in particular the chalk and/or silicon dioxide, are employed preferably in a quantity from 1 to 40 wt. %, in particular from 10 to 35 wt %, based in each case on the mass of the total pumpable, thermally expandable preparation.

The term "silicon dioxide" according to the invention also includes the oxide forms of silicon known as "silicic acid" or in English as "silica".

It is preferred according to the invention if the preparation contains at least one surface-modified silicon dioxide; particularly advantageous properties as a surface-modified silicon dioxide are exhibited by hydrophobically modified silicon dioxides.

Particularly preferred according to the invention are surface-modified silicon dioxide types having a specific surface area of at least 100 m$^2$/g, in particular of at least 150 m$^2$/g (measured by the BET method in each case), since it has been demonstrated that these significantly improve the homogeneity of the thermally expandable preparation, particularly during heating, and thus counteract a separation of the epoxy resins which is otherwise occasionally observed.

A content from 0 to 5 wt. %, in particular 0.1 to 4 wt. %, most particularly 0.5 to 3 wt. % of surface-modified silicon dioxide, based on the total pumpable, thermally expandable preparation, is particularly preferred.

It has proved particularly advantageous according to the invention if the thermally expandable preparations contain chalk and surface-modified silicon dioxide.

Moreover, it has proved to be preferred according to the invention if the thermally expandable preparations are paste-like after their application, particularly in a time window of at least 5 minutes after application. It is particularly preferred according to the invention if the preparations are non-sag after their application. "Non-sag" is preferably understood according to the invention to mean that the preparations, when they are applied vertically to the ground in the form of a bead on an upright steel plate and left there for 30 minutes at 120° C., change their original position under the influence of gravity by at most 3 mm. The bead of adhesive is preferably applied using a triangular nozzle with a height of 13 mm and a width of 8 mm.

In a further embodiment of the present invention, it has proved advantageous, particularly with regard to the mechanical properties of the cured preparation, if the pumpable, thermally expandable preparation additionally contains one or more different impact modifiers.

These impact modifiers can be selected e.g. from: thermoplastic isocyanates or polyurethanes, rubber particles, in particular those having a core-shell structure, and block copolymers, in particular those that contain a first polymer block having a glass transition temperature of below 15° C. and a second polymer block having a glass transition temperature of above 25° C.

These block copolymers are preferably selected from those in which a first polymer block is selected from a polybutadiene or polyisoprene block and a second polymer block is selected from a polystyrene or polymethyl methacrylate block. Specific examples of these are block copolymers with the following block structure: styrene-butadiene-(meth)acrylate, styrene-butadiene-(meth)acrylic acid ester, ethylene-(meth)acrylic acid ester-glycidyl(meth) acrylic acid ester, ethylene-(meth)acrylic acid ester-maleic anhydride, methyl methacrylate-butyl acrylate-methyl methacrylate.

Preferred impact modifiers according to the invention are also rubber particles with a core-shell structure, which have a core comprising a polymer material having a glass transition temperature of below 0° C. and a shell comprising a polymer material having a glass transition temperature of above 25° C. Particularly suitable rubber particles with a core-shell structure can have a core comprising a diene homopolymer, a diene copolymer or a polysiloxane elastomer and/or a shell comprising an alkyl(meth)acrylate homopolymer or copolymer.

For example, the core of these core-shell particles can contain a diene homopolymer or copolymer, which can be selected from a homopolymer of butadiene or isoprene, a copolymer of butadiene or isoprene with one or more ethylenically unsaturated monomers, such as e.g. vinyl aromatic monomers, (meth)acrylonitrile, (meth)acrylates or similar monomers. The polymer or copolymer of the shell can contain as monomers e.g.: (meth)acrylates, such as in particular methyl methacrylate, vinyl aromatic monomers (e.g. styrene), vinyl cyanides (e.g. acrylonitrile), unsaturated acids or anhydrides (e.g. acrylic acid), (meth)acrylamides and similar monomers that lead to polymers having a suitable high glass transition temperature.

The polymer or copolymer of the shell can comprise acid groups that are capable of crosslinking by metal carboxylate formation, e.g. by salt formation with divalent metal cations. Furthermore, the polymer or copolymer of the shell can be covalently crosslinked by employing monomers that have two or more double bonds per molecule.

As a core, other rubber-like polymers can be used, such as e.g. polybutyl acrylate, or polysiloxane elastomers, such as e.g. polydimethylsiloxane, in particular crosslinked polydimethylsiloxane.

These core-shell particles are typically constructed such that the core makes up 50 to 95 wt. % of the core-shell particle and the shell makes up 5 to 50 wt. % of this particle.

These rubber particles are preferably relatively small. For example, the average particle size (as determined e.g. by light-scattering methods) can be in the range from about 0.03 to about 2 μm, in particular in the range from about 0.05 to about 1 μm. However, smaller core-shell particles can also be used, e.g. those having an average diameter smaller than about 500 nm, in particular smaller than about 200 nm. For example, the average particle size can be in the range from about 25 to about 200 nm.

The production of these core-shell particles is known in the prior art, as stated e.g. in WO 2007/025007 on page 6, lines 16 to 21. Commercial sources of supply of these core-shell particles are listed in this document in the last paragraph on page 6 to the first paragraph on page 7. Explicit reference is hereby made to these sources of supply. Reference is also made to production methods for these particles, which are described in the said document from page 7, 2nd paragraph, to page 8, 1st paragraph. For further information on suitable core-shell particles, reference is also made to the said document WO 2007/025007, which contains detailed information on this from page 8, line 15, to page 13, line 15.

The same function as the above-mentioned rubber particles with a core-shell structure can be fulfilled by inorganic particles having a shell comprising organic polymers.

In this embodiment, the thermally expandable preparation according to the invention preferably contains inorganic particles having a shell comprising organic polymers, wherein the organic polymers are selected from homo- or copolymers of acrylic acid ester and/or methacrylic acid ester and consist of at least 30 wt. % acrylic acid ester and/or methacrylic acid ester incorporated by polymerization.

The acrylic acid and/or methacrylic acid esters preferably represent methyl and/or ethyl esters, with at least a portion of the esters particularly preferably being present as methyl esters. In addition, the polymers can also contain non-esterified acrylic and/or methacrylic acid, which can improve the binding of the organic polymers to the surface of the inorganic particles. In this case, therefore, it is particularly preferred if the monomer units comprising non-esterified acrylic and/or methacrylic acid are located at (close to) the end of the polymer chain that binds to the surface of the inorganic particles.

It is preferred in this case for the organic polymers to consist of at least 80 wt. % acrylic acid ester and/or methacrylic acid ester. In particular, they can consist of 90 wt. % or 95 wt. % thereof or can consist completely thereof. Insofar as the organic polymers contain monomers other than these acrylic acid and/or methacrylic acid esters or non-esterified acrylic acid and/or methacrylic acid, these are preferably selected from comonomers comprising epoxy, hydroxy and/or carboxyl groups.

The organic polymers of the shell are preferably uncrosslinked or so weakly crosslinked that no more than 5% of monomer units in a chain are crosslinked with monomer units in another chain. It can be advantageous in this case for the polymers close to the surface of the inorganic particles to be more strongly crosslinked than further out in the shell. In particular, the shell is preferably constructed such that at least 80%, in particular at least 90% and particularly preferably at least 95% of the polymer chains are bound with one end onto the surface of the inorganic particles.

The inorganic particles preferably have an average particle size in the range from 1 to 1000 nm, in particular in the range from 5 to 30 nm, before the shell comprising organic polymers is applied. As is known, the particle size can be determined by light-scattering methods and by electron microscopy.

The shell comprising organic polymers has a lower density than the inorganic particles themselves. The shell comprising organic polymers preferably has a thickness such that the weight ratio of the inorganic core to the shell comprising organic polymers is in the range from 2:1 to 1:5, preferably in the range from 3:2 to 1:3. This can be controlled by the selection of the reaction conditions when growing the shell comprising organic polymers onto the inorganic particles.

In general, the inorganic particles can be selected from metals, oxides, hydroxides, carbonates, sulfates and phosphates. Mixed forms of oxides, hydroxides and carbonates, such as e.g. basic carbonates or basic oxides, can also be present here. If inorganic particles comprising metals are selected, preferably iron, cobalt, nickel or alloys consisting of at least 50 wt. % of one of these metals are suitable. Oxides, hydroxides or mixed forms thereof are preferably selected from those of silicon, cerium, cobalt, chromium, nickel, zinc, titanium, iron, yttrium, zirconium and/or aluminum. Mixed forms of these are also possible, such as e.g. particles of aluminosilicates or silicate glasses. Particularly preferred are zinc oxide, aluminum oxides or hydroxides and $SiO_2$ or the oxide forms of silicon known as "silicic acid" or in English as "silica". Furthermore, the inorganic particles can consist of carbonates, such as e.g. calcium carbonate, or of sulfates, such as e.g. barium sulfate. It is, of course, also possible for particles with different compositions of inorganic cores to be present together.

To produce the inorganic particles having a shell comprising organic polymers, it is possible to proceed e.g. as described in WO 2004/111136 A1 using the example of coating zinc oxide with alkylene ether carboxylic acids. According to this procedure, the untreated inorganic particles are suspended in a non-polar or weakly polar solvent, and then monomer or prepolymer constituents of the shell are added, the solvent is removed and the polymerization is initiated, e.g. free-radically or photochemically. Furthermore, it is possible to proceed by the production method described in EP 1 469 020 A1, employing monomers or prepolymers of the shell material as the organic coating component for the particles. Furthermore, the encapsulated particles can be produced by "atom transfer radical polymerization", as described by way of example for the polymerization of n-butyl acrylate on silica nanoparticles in: G. Carrot, S. Diamanti, M. Manuszak, B. Charleux, J.-P. Vairon: "Atom Transfer Radical Polymerization of n-Butyl Acrylate from Silica Nanoparticles", J. Polym. Sci., Part A: Polymer Chemistry, Vol. 39, 4294-4301 (2001).

Furthermore, it is possible to resort to production methods as described in WO 2006/053640. For the present invention, inorganic cores as described in WO 2006/053640 from page 5, line 24, to page 7, line 15, with their production methods should be selected here. The coating of these cores takes place as described in this document from p. 10, line 22, to p. 15, line 7. It is also possible to follow the suggestion of this document (page 15, lines 9 to 24) to subject the inorganic cores to a pretreatment before polymerizing on the shell. The said passage reads:

"In particular on use of inorganic cores, it may also be preferred for the core to be subjected to pre-treatment which enables bonding of the shell before the shell is polymerized on. This can usually consist in chemical functionalization of the particle surface, as is known from the literature for a very wide variety of inorganic materials. It may particularly preferably involve application to the surface of chemical functions which, as reactive chain end, enable grafting-on of the shell polymers. Examples that may be mentioned in particular here are terminal double bonds, epoxy functions and polycondensable groups. The functionalization of hydroxyl-carrying surfaces with polymers is disclosed, for example, in EP-A-337 144".

Another group of preferred impact modifiers are suitable block copolymers. These are preferably selected from those that contain a first polymer block having a glass transition temperature of below 15° C., in particular of below 0° C., and a second polymer block having a glass transition temperature of above 25° C., in particular of above 50° C. Furthermore, those block copolymers that are selected from those in which a first polymer block is selected from a polybutadiene or polyisoprene block and a second polymer block is selected from a polystyrene or a polymethyl methacrylate block are suitable.

For example, the block copolymer is selected from copolymers with the following block structure: styrene-butadiene-(meth)acrylate, styrene-butadiene-(meth)acrylic acid ester, ethylene-(meth)acrylic acid ester-glycidyl(meth) acrylic acid ester, ethylene-(meth)acrylic acid ester-maleic anhydride, (meth)acrylic acid ester-butyl acrylate-(meth) acrylic acid ester, preferably methyl methacrylate-butyl acrylate-methyl methacrylate The above-mentioned block copolymers correspond to those that can also be employed within the framework of the already cited WO 2007/025007. Further details on these and other block copolymers that are also suitable within the framework of the present invention can be taken from this document from p. 25, l. 21 to p. 26, l. 9. Cross references to documents in which the production of these block copolymers is described can also be found there.

The composition of these block copolymers is defined above by stating the monomer unit for each block. This should be understood as meaning that the block copolymer in each case contains polymer blocks comprising the said monomers. In the individual polymer blocks here, up to 20 mole % of the said monomers can be replaced by other comonomers. This applies in particular to blocks comprising polymethyl methacrylate.

The said block copolymers improve the impact resistance of the cured materials according to the invention, in particular at temperatures below 0° C.

The impact modifiers are contained in the preparations according to the invention preferably in quantities of 0 to 20 wt. %, preferably 5 to 15 wt. % (calculated as active substance content of the impact modifier) based on the total application preparation.

In a further preferred embodiment, the preparations according to the invention contain at least one flame retardant. By employing flame retardants, it is possible to employ the preparations according to the invention for stiffening and/or reinforcing in the area of passenger compartments while simultaneously reducing the risk of fire in these areas.

The flame retardant is preferably selected from the group of the halogenated (in particular brominated) ethers of the "Ixol" type from Solvay, brominated alcohols, in particular dibromoneopentyl alcohol, tribromoneopentyl alcohol and PHT-4-diol (1,2-benzenedicarboxylic acid, 3,4,5,6-tetrabromo-2-(2-hydroxyethoxy)ethyl-2-hydroxypropyl ester), organic phosphates, in particular diethyl ethanephosphonate (DEEP), triethyl phosphate (TEP), dimethyl propyl-phosphonate (DMPP), diphenyl cresyl phosphate (DPK), as well as chlorinated phosphates (e.g. tris(1-methyl-2-chloroethyl) phosphate (TMCP), Albemarle), in particular tris(2-chloroethyl)phosphate, tris(2-chloroisopropyl)phosphate (TCPP), tris(1,3-dichloroisopropyl)phosphate, tris(2,3-dibromopropyl)phosphate and tetrakis(2-chloroethyl)ethylene diphosphate or mixtures thereof.

Other preferred flame retardants according to the invention are elemental red phosphorus, polyphosphate compounds, such as e.g. melamine polyphosphate and/or ammonium polyphosphate, aluminum trihydrate (ATH), "expandable graphites" and dihydrooxaphosphaphenanthrene oxide (DOPO).

The preparation according to the invention contains the flame retardant preferably in a quantity from 1 to 65 wt. %, particularly preferably from 1 to 30 wt. %, based on the total pumpable, thermally expandable preparation. Particularly preferred are contents of flame retardants in the range from 5 to 25 wt. %, in particular from 15 to 20 wt. %, based on the total pumpable, thermally expandable preparation.

The thermally expandable preparations according to the invention can be produced by mixing the selected components in any suitable mixer, such as e.g. a dispersion mixer, a planetary mixer, a twin-screw mixer, a continuous mixer or an extruder, in particular a twin-screw extruder.

Although it may be advantageous to heat the components somewhat in order to achieve a homogeneous, uniform material, it must be ensured that no temperatures are reached that would cause activation of the thermally activatable hardener and/or of the thermally activatable blowing agent.

The storage of the preparations according to the invention until they are used preferably takes place in nozzle cartridges or drums, such as e.g. hobbocks.

At the time of use, the preparation according to the invention is transported by conventional heated pumps from the storage container to the site where it is to be used, and is applied there. Application up to a layer thickness of 5 cm is possible without any problems, so that even relatively large hollow spaces, e.g. tubes having a corresponding internal diameter, can easily be filled.

The expansion of the applied thermally expandable preparation takes place by heating, which involves heating the preparation for a specific time to a specific temperature that is sufficient to bring about the activation of the blowing agent and of the hardener.

Depending on the composition of the preparation and the conditions of the manufacturing line, these temperatures are usually in the range from 130° C. to 240° C., preferably 150° C. to 200° C., with a residence time from 10 to 90 minutes, preferably from 15 to 60 minutes.

The nature of the heat source is immaterial, in principle, so the heat input can take place e.g. by a hot-air blower, by microwave irradiation, by magnetic induction or by heating clamps. In the automotive construction sector as well as in fields of technology that use related production processes, it is particularly advantageous if the expansion of the preparations according to the invention takes place while the component or vehicle is passing through the oven for curing the electrophoretic coating or for baking powder coatings, so that no separate heating step has to be provided.

Those preparations that exhibit an exothermicity value of the curing reaction of less than 300 J/g, in particular less than 250 J/g, most particularly less than 220 J/g, may be preferred according to the invention. The exothermicity value of the curing reaction is determined according to the invention by DSC measurement in a temperature range from 25° C. to 250° C. with a rate of heating of 5 K/min.

The present invention secondly provides a method for stiffening and/or reinforcing components having thin-walled structures, in particular tubular structures, in which a thermally expandable preparation pumpable at application temperatures below 70° C. according to the invention is applied at a temperature below 70° C. onto the surface of the structure to be reinforced with a pump pressure of less than 200 bar and said preparation is cured at a later point in time at temperatures above 130° C.

Application of the preparation in a temperature range from 50° C. to 60° C. is particularly preferred here according to the invention.

Furthermore, application at an application pressure from 6 bar to 180 bar is particularly preferred.

The actual curing takes place according to the invention at a "later point in time". Thus, it is for example conceivable according to the invention that the components to be stiffened are coated with the pumpable, thermally expandable preparations and then placed in intermediate storage. The intermediate storage in this case can also include e.g. transport to another works. This intermediate storage can last up to several weeks.

In another embodiment, however, it is also conceivable that the components to be stiffened are subjected to a curing step shortly after coating with the pumpable, thermally expandable preparation. This can take place immediately or, in the case of assembly-line production, after reaching one of the subsequent stations. It is particularly preferred according to the invention within the framework of this embodiment if the curing step takes place within 24 h, in particular within 3 h, after application of the preparation according to the invention.

The pumpable, thermally activatable foams according to the invention can be employed in all products that have hollow spaces or tubular structures to be reinforced. In addition to vehicles, these are e.g. aircraft, domestic appliances, furniture, buildings, walls, partitions or boats as well as all devices having a supporting frame structure comprising tubes, such as e.g. sports equipment, mobility aids, frameworks and bicycles.

Examples of sports equipment in which the present invention can be used advantageously are bicycles, fishing nets, fishing rods, goal posts, tennis net posts and support structures for basketball baskets.

The term "bicycle" is understood according to the invention to mean any usually two-wheeled, single-track vehicles that are driven by operating pedals.

In addition to the conventional bicycle structures, in which the rider adopts a seated position, recumbent bicycles, for example, are also intended to be included according to the invention. In addition to the conventional fixed frames, structures with hinges, such as e.g. folding bicycles, are also intended to be included according to the invention. Vehicles with three or more wheels are also intended to be included.

The preparations according to the invention can reinforce e.g. the constituents of a diamond frame, sloping frame, space frame, cross frame, trapeze frame, English-style frame, double-bend frame, wave frame, easy-boarding frame or Y frame.

Furthermore, the preparations according to the invention can be employed to reinforce the frame structures of mobility aids, such as e.g. wheelchairs, rollators, walking supports, assistive canes or walking frames.

In the area of automotive construction, the use of the preparations according to the invention has proved advantageous in particular in the area of the structure of the driver's safety cage or passenger compartment, since it can provide the structure with great stability together with low weight. The preparation according to the invention can be employed advantageously in particular in the construction of all classes of racing cars (formula I, touring cars, rally vehicles etc.).

Another preferred field of application for the present invention is the tools sector. There are no restrictions in principle regarding the type of tools. Thus, for example, these can be tradesmen's equipment, specialist tools, gardening equipment, such as e.g. spades or wheelbarrows, or kitchen equipment. Common to all these components is the fact that the preparation according to the invention enables the structure to be stabilized without significantly increasing the total weight.

Furthermore, the preparations according to the invention can be employed advantageously to stabilize frames. "Frames" are understood according to the invention to be lateral surrounds, such as e.g. picture frames, window frames or door frames.

Another field of application is the reinforcing of all types of frameworks. In this field of application too, the high stability of the appropriately reinforced structures is paramount. The frameworks in which the preparation according to the invention can be used include e.g. all types of ladders, but also construction site scaffolding, structural frameworks for exhibition stand construction, structures for concert stages, such as e.g. supporting and mounting structures used as trusses, and light poles for stadiums or spectator stands.

Another broad area of application is the street furniture sector. This sector includes traffic light and lighting systems as well as all other structures, such as e.g. bus shelters, platform railings, seat structures, road signs, bicycle stands or crash barriers.

With regard to the further details of this subject-matter of the present invention, the statements relating to the first subject-matter apply *mutatis mutandis*.

The present invention thirdly provides the use of a thermally expandable preparation pumpable at application temperatures below 70° C. according to the invention for stiffening and/or reinforcing components having thin-walled structures, in particular tubular structures.

With regard to the further details of this subject-matter of the present invention, the statements relating to the other subject-matters apply *mutatis mutandis*.

The present invention fourthly provides a component having a thin-walled structure, which component has been stiffened and/or reinforced with a thermally expandable preparation pumpable at application temperatures below 70° C. according to the invention by curing.

In the case of this subject-matter of the invention too, the statements relating to the other subject-matters also apply *mutatis mutandis* with regard to the details.

EXEMPLARY EMBODIMENTS

1 Production of the Formulations

The following thermally expandable preparations were produced.

Unless otherwise specified, the quantitative data are expressed as percentages by weight.

TABLE 1

| Raw material | Formulation | | | | | |
| --- | --- | --- | --- | --- | --- | --- |
| | F1 | F2 | F3 | F4 | F5 | F6 |
| DER ® 331 | 5.0 | 25.0 | 25.0 | 50.0 | 25.0 | 25.0 |
| DER ® 736 | 25.0 | 10.0 | — | — | — | — |
| Prepolymer A | 20.0 | — | 10.0 | 10.0 | 20.0 | 10.0 |
| DER ® 32 | — | 10.0 | — | — | — | — |
| Thioplast ® EPS-25 | — | 10.0 | — | — | — | — |
| Adeka ® QR-9466 | 5.0 | 5.8 | — | — | 12.0 | — |
| Flexibilize ® DY-965 | 5.0 | — | 15.0 | — | — | 13.1 |
| Kevlar ® 1F561 | — | — | 5.0 | — | 7.0 | 1.5 |
| Kevlar ® 1F1464 | — | 5.0 | — | 7.0 | — | — |
| Kevlar ® 1F107 | 2.5 | — | — | — | — | — |
| Omyacarb ® 4HD | 15.0 | 11.0 | 23.5 | 13.7 | 14.0 | 34.0 |
| 3M GB ® VS5500 | 15.0 | 15.0 | 15.0 | 10.0 | 15.0 | 10.0 |
| Cab-o-Sil ® TS720 | 2.0 | 2.0 | 2.0 | 2.0 | 2.0 | 2.0 |
| Dyhard ® 100SH | 4.2 | 4.9 | 3.2 | 6.0 | 3.7 | 3.1 |
| Fenuron | 0.3 | 0.3 | 0.3 | 0.3 | 0.3 | 0.3 |
| Expancel ® 909 DU80 | 1.0 | 1.0 | 1.0 | 1.0 | 1.0 | 1.0 |
| Total | 100.0 | 100.0 | 100.0 | 100.0 | 100.0 | 100.0 |

In addition, the following thermally expandable preparation according to the invention was produced, which additionally contains flame retardant:

| Formulation F7 | Quantity [wt. %] |
| --- | --- |
| DER ® 331 | 37.7 |
| Prepolymer A | 14.0 |
| Exolit ® OP930 | 10.0 |
| Exolit ® AP422 | 4.0 |
| Exolit ® RP6500 | 2.0 |
| Martinal ® ON313 | 14.0 |
| 3M GB VS5500 | 7.5 |
| Kevlar ® 1F1464 | 2.5 |
| Cab-o-Sil ® TS-720 | 2.0 |
| Dyhard ® 100SH | 5.0 |
| Fenuron | 0.3 |
| Expancel ® 909 DU80 | 1.0 |
| Total | 100.0 |

2. List of Commercial Products Employed

| | |
| --- | --- |
| 3M GB ® VS5500 | hollow glass spheres; manufacturer 3M; density 0.38 g/cm³ |
| Adeka ® QR-9466 | modified polyurethane resin; manufacturer Adeka |

-continued

| | |
|---|---|
| Cab-o-sil® TS-720 | silicon dioxide, pyrogenic amorphous silica, manufacturer Cabot |
| DER® 331 | reaction product of bisphenol A with epichlorohydrin; EEW approx. 187 g/eq; viscosity at 25° C. 12.5 Pa * s; manufacturer Dow |
| DER® 732 | reaction product of epichlorohydrin with polypropylene glycol; EEW approx. 320 g/eq; viscosity at 25° C. 0.034 Pa * s; manufacturer Dow |
| DER® 736 | reaction product of epichlorohydrin with polypropylene glycol; EEW approx. 190 g/eq; viscosity at 25° C. 0.079 Pa * s; manufacturer Dow |
| Dyhard® 100SH | 1-cyanoguanidine; approx. 94.8% purity; manufacturer Evonik Degussa |
| Exolit® AP422 | ammonium polyphosphate; manufacturer Clariant |
| Exolit® OP930 | organophosphorus salt; manufacturer Clariant |
| Exolit® RP6500 | microencapsulated red phosphorus (approx. 43-47 wt. %) in epoxy resin (approx. 52-57 wt. %); manufacturer Clariant |
| Expancel® 909 DU80 | expandable hollow microspheres comprising acrylonitrile, methacrylonitrile and methyl methacrylate copolymers; manufacturer Expancel |
| Flexibilizer® DY-965 | reactive impact modifier for epoxy resins; manufacturer Huntsman |
| Kevlar® 1F107 | Kevlar fibers having a nominal length of 6.4 mm; manufacturer DuPont |
| Kevlar® 1F1464 | Kevlar fibers having a nominal length of 2.7 mm; manufacturer DuPont |
| Kevlar® 1F561 | Kevlar fibers having a nominal length of 1.5 mm; manufacturer DuPont |
| Martinal® ON313 | aluminum hydroxide (purity 99.6%; particle size 11-15 μm); manufacturer Albemarle |
| Omyacarb® 4HD | calcium carbonate; pulverized limestone; manufacturer Omya GmbH |
| Prepolymer A | reaction product of bisphenol A diglycidyl ether and alkyl polyoxyalkylene amine; EEW approx. 450 g/eq; viscosity at 25° C.: 160 Pa * s; |
| Thioplast® EPS-25 | epoxy-terminated, aliphatic polysulfide; EEW approx. 550 g/eq; viscosity at 25° C. 2.8 Pa * s; manufacturer Akzo Nobel |

To produce the preparations, the resins were each charged into an unheated planetary mixer and homogenized for at least 20 min under a vacuum of less than 100 mbar at a mixing rate of 100 rpm. The fillers were then added stepwise and the resulting mixtures were each mixed at max. 50 rpm until homogeneous materials were present. The mixtures were then homogenized for a further 20 min under a vacuum of less than 100 mbar at a mixing rate of 100 rpm. The remaining raw materials were then added to the formulations and mixed at max. 50 rpm until homogeneous materials were present. Finally, the mixtures were homogenized for a further 10 min under a vacuum of less than 100 mbar at a mixing rate of 100 rpm and packed into cartridges. Throughout the entire mixing and homogenizing processes, it was ensured that the preparation did not become hotter than 60° C. as a result of any heat of mixing that occurred.

3 Determination of the Properties of the Preparations 3.1 Determination of Flow Rate To determine the flow rate, 310 ml of each of the preparations were packed according to Table 1 into aluminum cartridges with a capacity of 310 ml and an internal diameter of 46 mm and preheated there for 45 minutes at 60° C. The preparations were then each discharged at a temperature of 60° C. with a pressure of 6 bar through the discharge outlet of the cartridge, which had been produced using a cartridge-piercing tool (punch) with an external diameter of 9.0 mm, without using a nozzle. The measuring interval was selected in each case as a function of the flow rate of the system to be measured. Thus, for preparations with a flow rate of at least 1000 g/min, the entire cartridge was emptied and the time needed for this was determined; for very high flow rates, the cartridges emptied so rapidly that only an approximate value could be established. For preparations with a flow rate below 1000 g/min, a measuring interval of 15 seconds in each case was selected.

3.2 Determination of Tensile Shear Strength

The preparations according to the invention were applied from the cartridges onto untreated steel plates cleaned with ethyl acetate (grade DC05; layer thickness 1.5 mm; width 25 mm). The steel plates treated with the preparations according to the invention were brought into contact with one another in such a way that an overlap region of 10 mm was obtained. The specimens were pressed to the bonding gap thickness (using glass spheres having a diameter of 200 μm as spacers), fixed with clamps and then cured for 30 min at 170° C. The measurement took place on the following day at 25° C. and using a pulling speed of 10 mm/min. In all cases, a cohesive fracture behavior was observed for the preparations according to the invention (referred to in the table as "c.f.").

3.3 Determination of Non-Sag Properties

To determine the non-sag properties of the formulations, their sliding behavior was investigated. To this end, using a triangular nozzle as employed e.g. for applying PUR-based windshield adhesives, beads of adhesive with a height of 13 mm and a width of 8 mm were applied onto cleaned steel plates. The plates were then placed in an oven for 30 min at 120° C. at an angle of 90° in such a way that the beads of adhesive stood vertical to the ground. At the end of the test, it was determined how far the beads of adhesive had moved from their original position. A slide of up to 3 mm was tolerated here and evaluated as "acceptable" ("OK"), while a greater slide was marked as "not acceptable" ("n.OK").

3.3 Test Results

TABLE 2

| Preparation | F1 | F2 | F3 | F4 | F5 | F6 |
|---|---|---|---|---|---|---|
| Flow rate [g/min] | 1130 | >4000 | 235 | 1150 | 460 | >2400 |
| Non-sag properties | OK | OK | OK | OK | OK | OK |
| Tensile shear strength [MPa] | 9.3 (c.f.) | 13.5 (c.f.) | 14.2 (c.f.) | 15.1 (c.f.) | 14.0 (c.f.) | 11.3 (c.f.) |

The results shown in the above table clearly demonstrate that formulations (F1 to F6) according to the invention have good application properties (recognizable by the flow rate in [g/min]) together with good non-sag properties (i.e. low slip).

The invention claimed is:

1. A thermally expandable preparation pumpable at application temperatures below 70° C., comprising
    (a) at least one first epoxy resin E1 that has an epoxy equivalent weight of at most 280 g/eq and a viscosity at 25° C. of at most 1250 Pa*s,
    (b) at least one second epoxy resin E2 that has an epoxy equivalent weight of at least 300 g/eq and a viscosity at 25° C. of at most 250 Pa*s,
    (c) at least one thermally activatable hardener,
    (d) at least one thermally activatable blowing agent,
    (e) at least 1 wt. % organic fibers having a fiber length from 0.2 mm to 10 mm, and
    (f) at least 20 wt. % fillers.

2. The preparation according to claim 1, characterized in that it contains at least 30 wt. % fillers, based in each case on the total application preparation.

3. The preparation according to claim 1, characterized in that the at least one filler is a lightweight filler.

4. The preparation according to claim 1, characterized in that the at least one filler is an inorganic filler.

5. The preparation according to claim 1, characterized in that the at least one filler is surface-treated silicon dioxide.

6. The preparation according to claim 1, characterized in that it contains less than 1.5 wt. %, based on the total application preparation, of an epoxy resin that is solid at 25° C.

7. The preparation according to claim 1, characterized in that the first epoxy resin E1
has an epoxy equivalent weight of at most 200 g/eq, and/or
has a viscosity at 25° C. of at most 20 Pa*s, and/or
is contained in the preparation in a quantity from 10 to 55 wt. %, based on the total application preparation.

8. The preparation according to claim 1, characterized in that the second epoxy resin E2
has an epoxy equivalent weight of at least 400 g/eq, and/or
has a viscosity at 25° C. of at most 200 Pa*s, and/or
is contained in the preparation in a quantity from 5 to 35 wt. %, based on the total application preparation.

9. The preparation according to claim 1, characterized in that it contains at least one impact modifier and/or at least one flame retardant.

10. A method for stiffening and/or reinforcing components having thin-walled structures, in particular tubular structures, characterized in that a thermally expandable preparation pumpable at application temperatures below 70° C. according to one of claims 1 to 9 is applied at a temperature below 70° C., at a pump pressure of less than 200 bar, onto the surface of the structure to be reinforced, and said preparation is cured at a later point in time at temperatures above 130° C.

11. A component having a thin-walled structure, which component has been stiffened and/or reinforced with a thermally expandable preparation pumbable at application temperatures below 70° C. according to one of claims 1 to 9, in the cured state.

12. The preparation according to claim 1, characterized in that the filler is hollow glass spheres.

13. The preparation according to claim 1, characterized in that the filler is chalk.

* * * * *

UNITED STATES PATENT AND TRADEMARK OFFICE
CERTIFICATE OF CORRECTION

| | |
|---|---|
| PATENT NO. | : 9,790,341 B2 |
| APPLICATION NO. | : 14/491034 |
| DATED | : October 17, 2017 |
| INVENTOR(S) | : Emilie Barriau et al. |

It is certified that error appears in the above-identified patent and that said Letters Patent is hereby corrected as shown below:

Column 2, Line 9: Change "thermomechanical" to -- thermo mechanical --.

Column 3, Line 30: Change "15 Pats" to -- 15 Pa*s --.

Column 8, Line 32: Change "(Finite)" to -- (Fillite) --.

Column 16, Table 1 (Line 28): Change "DER® 32" to -- DER® 732 --.

Column 16, Table 1 (Line 31): Change "Flexibilize ® DY-965" to -- Flexibilizer® DY-965 --.

Signed and Sealed this
Third Day of July, 2018

Andrei Iancu
*Director of the United States Patent and Trademark Office*